United States Patent [19]

Bergloff

[11] 3,923,208
[45] Dec. 2, 1975

[54] FLUID EXPULSION SYSTEM HAVING A TAPERED TANK

[75] Inventor: Raymond A. Bergloff, Woodland Hills, Calif.

[73] Assignee: The United States of America as represented by the Secretary of the Army, Washington, D.C.

[22] Filed: July 19, 1974

[21] Appl. No.: 490,165

[52] U.S. Cl. .................. 222/386; 222/389; 92/15; 92/169
[51] Int. Cl.² .......................................... B67D 5/46
[58] Field of Search ....... 222/389, 3, 386, 541, 387, 222/390; 239/322; 169/33; 92/15, 169; 141/27, 113

[56] References Cited
UNITED STATES PATENTS

| 1,729,219 | 9/1929 | Kellogg | 222/326 |
| 2,831,483 | 4/1958 | De Lorenzo | 222/386 X |
| 2,880,913 | 4/1959 | Petron | 222/386 X |
| 3,405,845 | 10/1968 | Cook et al. | 222/389 X |
| 3,545,343 | 12/1970 | Orbeck | 222/389 X |
| 3,729,031 | 4/1973 | Baldwin | 141/27 X |
| 3,804,635 | 4/1974 | Weber | 222/386 X |

FOREIGN PATENTS OR APPLICATIONS

| 648,884 | 9/1962 | Canada | 222/389 |
| 499,743 | 1/1939 | United Kingdom | 222/386 |

Primary Examiner—Robert B. Reeves
Assistant Examiner—Charles A. Marmor
Attorney, Agent, or Firm—Lawrence A. Neureither; Joseph H. Beumer; Harold W. Hilton

[57] ABSTRACT

A fluid expulsion system including a tank having a fluid therein and a piston for expelling the fluid from the tank. The piston is mounted in the tank with a gas generator on the first side of the piston and the fluid on the second side of the piston. Responsive to actuation of the gas generator pressure is built up on the first side of the piston and the piston is displaced against the fluid to force the fluid from the tank. The piston and tank passage of the fluid past the piston because of leakage and extrusion due to the gap created between the piston and tank wall responsive to tank expansion under pressure.

2 Claims, 2 Drawing Figures

FLUID EXPULSION SYSTEM HAVING A TAPERED TANK

BACKGROUND OF THE INVENTION

The device of the present invention solves the problem of piston seal leakage and extrusion in high pressure expulsion systems, where the leakage and extrusion are due to the gap created between the piston and tank wall when the tank expands under pressure. In previous applications, the tank wall was either made heavy enough to reduce the amount of expansion, or a sleeve was inserted into the cylindrical tank and pressurized externally, which prevented the sleeve from expanding. Other devices of a similar nature include a piston/cylinder arrangement with a rolling diaphragm as the seal between the piston and tank wall and a number of collapsing bladder designs. The device of the present invention controls the clearance between the piston and tank wall at high pressure so that standard seals can be used and operated under normal clearances; eliminates the need for a separate liner which is used to maintain normal clearances; and, permits a reduction in tank wall thickness resulting in less system weight for high pressure systems where wall expansion is a factor.

SUMMARY OF THE INVENTION

Apparatus for expelling fluid from a tank including a piston mounted in the tank bore which is machined at one section thereof to an initial internal diameter on one side of the piston and to a second larger internal diameter at a second section of the tank. The piston and associated seals are mounted in this second tank section for movement to the second tank section. Pressurizing means is provided on one side of the piston to displace the piston rearwardly to the first section of the tank to expel the fluid from the tank.

DESCRIPTION OF THE PREFERRED EMBODIMENT

Figure 1:
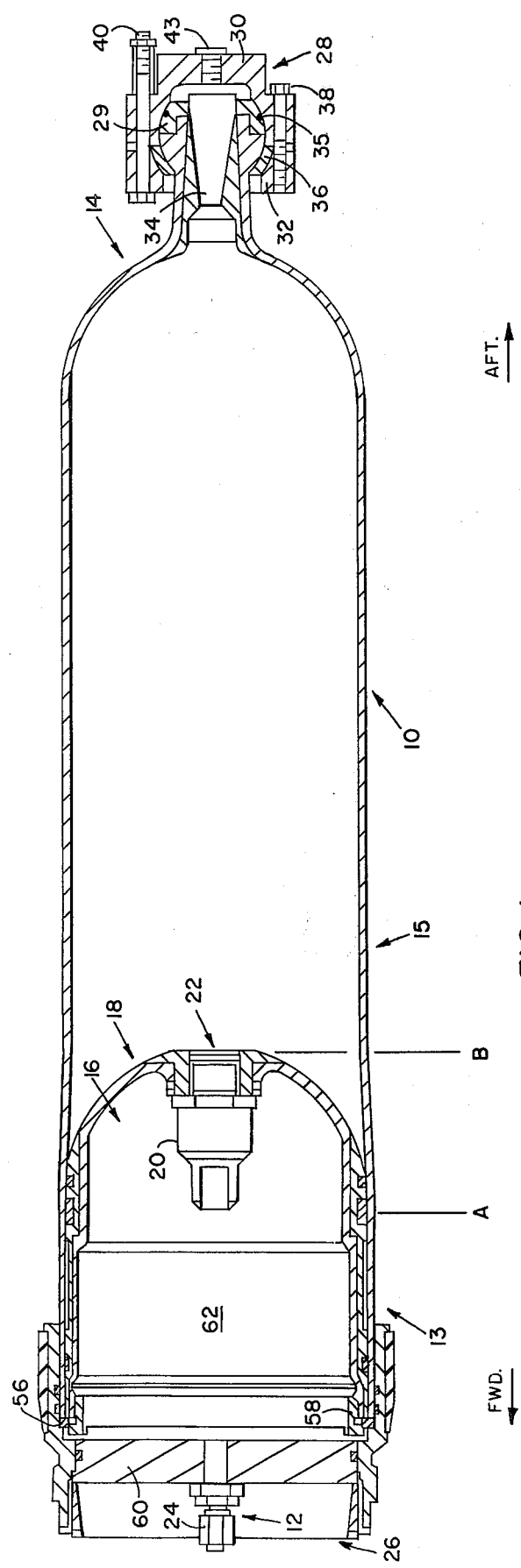
FIG. 1 is an elevational sectional view of the tank and piston assembly of this invention.

As shown in FIG. 1, a tank 10, as used for the fuel tank for a rocket, includes a forward end 12 and an aft end 14 and forward and aft sections 13 and 15. An intermediate section 17 is disposed between forward and aft sections 13 and 15.

A piston assembly 16 is mounted in the forward end 12 of the tank. The piston assembly includes piston 18 having a hollow interior and fill and drain valve 20 secured in one end 22 thereof in communication with the interior of the tank and a second fill and drain valve 24 secured in the second end 26 of the piston for communication with valve 20 and the atmosphere. To fill the tank with fluid, valves 24 and 20 are opened and a fill line is inserted through valve 24 and in communication with valve 20 which is in communication with the interior of the tank. Fluid is then pumped into the aft section 15 and intermediate section 17. After the tank is filled, valve 20 is closed off to retain the fluid in the tank.

An end closure assembly 28 is disposed at the aft end 14 of the tank. Closure assembly 28 includes a nut 29 secured in threaded relation around exit passage 34 of the tank. A pair of members 30 and 32 is secured around nut 29 and the end of the tank. Disposed between members 30 and 29 is a seal 35. A back-up ring 36 is mounted between member 32 and the neck of the tank. Members 30 and 32 are disposed in secured relation on the tank by a plurality of screws 38 and 40. A plug 43 is releasably secured in member 30 for retention of the fluid in the tank.

Figure 2:
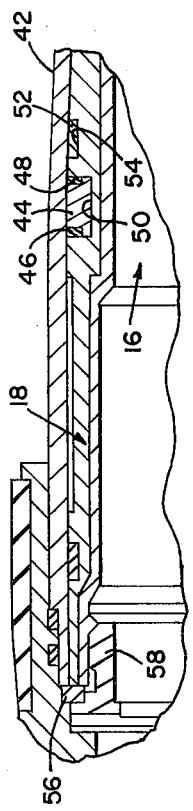
FIG. 2 is an enlarged sectional view illustrating the piston and seal arrangement in the tank of FIG. 1.

As more clearly shown in FIG. 2, the forward end 12 of the tank includes an annular wall 42 enclosing piston 18. A seal 44 having a pair of back-up rings 46 and 48 adjacent thereto is carried in a groove 50 in piston 18 in engagement with the inner surface of the annular wall 42. An annular piston guide member 52 is disposed in an annular groove 54 of piston 18.

To releasably retain the piston in the forward section 13 a shear ring assembly 56 is secured to the piston and the annular wall of tank 10. A piston retainer 58 is carried in the tank intermediate an end closure nut 60 and the piston for retention of the piston in section 13 of the tank.

A gas generator, generally designated by the numeral 62 is carried by the piston assembly for actuation to provide the pressure whereby the piston is displaced. The gas generator is commercially available and may be in the form of a powder grain, liquid, or gas, and is loaded through open valve 24 after the tank has been filled with fluid and valve 20 closed. After the hollow piston assembly has been filled with the gas generator, valve 24 is closed.

The system operates as follows: the tank bore is machined to the initial dimension aft of point B as shown. Forward of point A, the bore is machined oversize to accept an oversize piston with normal assembly clearance. From A to B the bore is tapered to the initial diameter aft of B. As charging pressure rises on the forward side of the piston, the shear ring 56 will fail, which permits the piston to begin moving aft. As the piston moves aft, pressure builds up in the tank. As the pressure rises in the tank to approximately 4,500 psia, the tank diameter expands from the initial bore size to the expanded bore size. The clearance between the expanded bore and the oversize piston is thereby held to a value which prevents seal extrusion and leakage. The bore taper length is determined by the tank pressure rise rate.

Thus it can be seen that some of the novel features of this invention are: clearance between the piston and tank wall can be held constant regardless of the pressure and resulting change in tank bore diameter; standard seals can be used without fear of being extruded or leaking excessively; and, eliminates bore expansion as a factor in seal selection and wall thickness determination.

I claim:

1. A fluid dispensing system comprising:
   a. a tank having a forward section, an aft section, and an intermediate section between said forward section and said aft section, said forward section of said tank having a larger diameter than said aft section of said tank, said intermediate section being tapered between the two diameters, said aft section having outlet means therein for dispensing liquid from said tank;
   b. a piston assembly carried in said forward section of said tank including a piston for displacement therefrom into said aft section, said piston having a hollow interior and an outer diameter greater than the internal diameter of said aft tank section, said piston assembly including aft and forward closed ends, a first fill and drain valve means carried in said aft closed end of said piston in communication with the interior of said piston assembly and said aft section of said tank, a second fill and drain valve means carried in the forward closed end of said piston assembly in communication with the interior thereof and the atmosphere;

c. gas generator means carried in said hollow interior of said piston for displacing said piston from said forward section into said aft section of said tank whereby responsive to displacement of said piston, the diameter of said aft section expands as a result of increased fluid pressure therein so that the clearance between the piston and tank wall is held constant; and, d. a shear ring secured to the inner wall of said tank and said piston for releasably securing said piston to said tank, said shear ring disposed for shearing and releasing said piston for the displacement thereof responsive to said gas exerting a force on said piston.

2. Apparatus as in claim 1 wherein said tank includes an aft end having said outlet means therein and, a plug carried in said outlet means for retention of said fluid in said tank, said plug disposed for expulsion from said outlet means responsive to pressurized fluid exerting a force thereon.

* * * * *